(12) United States Patent
Mayhew

(10) Patent No.: US 8,182,195 B2
(45) Date of Patent: May 22, 2012

(54) PROTECTIVE PILLOW

(76) Inventor: Allan J Mayhew, Edmonton (CA)

( * ) Notice: Subject to any disclaimer, the term of this patent is extended or adjusted under 35 U.S.C. 154(b) by 1270 days.

(21) Appl. No.: 10/908,093

(22) Filed: Apr. 27, 2005

(65) Prior Publication Data

US 2006/0245887 A1 Nov. 2, 2006

(51) Int. Cl.
- *B60P 3/12* (2006.01)
- *B66F 3/24* (2006.01)
- *B66F 3/25* (2006.01)

(52) U.S. Cl. ..... 414/563; 414/426; 414/595; 254/93 HP

(58) Field of Classification Search ............ 414/563, 414/463; 254/93 HP, 93 H
See application file for complete search history.

(56) References Cited

U.S. PATENT DOCUMENTS

| | | | |
|---|---|---|---|
| 4,010,858 A * | 3/1977 | Mahnke, Jr. | 414/563 |
| 4,934,414 A * | 6/1990 | Borel | 139/383 A |
| 5,013,209 A * | 5/1991 | DeMichele et al. | 414/563 |
| 5,802,651 A * | 9/1998 | Massey et al. | 14/71.3 |
| 6,139,250 A | 10/2000 | Nolasco | |
| 6,834,404 B2 * | 12/2004 | Fletcher | 5/611 |
| 2003/0082038 A1 | 5/2003 | Nolasco | |
| 2003/0231944 A1 | 12/2003 | Weller et al. | |
| 2006/0027276 A1 * | 2/2006 | Main | 138/93 |

OTHER PUBLICATIONS

"Air Cushions USA" website printouts, www.aircushions.com, printed Apr. 26, 2005 (11 pages).

* cited by examiner

*Primary Examiner* — Gregory Adams
(74) *Attorney, Agent, or Firm* — Anthony R. Lambert

(57) ABSTRACT

A pillow for towing a vehicle is provided, the pillow comprising an inflatable bladder having a top, a bottom, and sides, a valve for inflating and deflating the bladder, and the bottom of the pillow having a wheel lift conforming attachment for conforming to a wheel lift of a tow vehicle. A method of towing a vehicle comprises the steps of placing a vehicle having an undercarriage and weight on a wheel lift of a tow vehicle, inserting a resilient pillow between the wheel lift and the undercarriage of the vehicle and securing the resilient pillow to the wheel lift, transporting the vehicle to a destination, removing the resilient pillow from between the vehicle and the wheel lift once the vehicle has arrived at the destination, and removing the vehicle from the wheel lift.

12 Claims, 9 Drawing Sheets

PROTECTIVE PILLOW

BACKGROUND OF THE INVENTION

The wheel lift system for towing has been used in the towing industry for roughly the last fifteen years. More and more vehicles were coming out with fiberglass or composite body panels, and it was becoming obvious the safest way to tow a vehicle was by attaching to the wheels. The sling method was becoming out dated.

Although the wheel lift system has many advantages, there may be problems, too. One problem occurs between the wheel lift and the undercarriage of many front wheel drive vehicles. Typically, the operator of a tow vehicle will pick the vehicle up by the drive wheels whenever possible to prevent damage to the drive train. The drive train on many front wheel drive vehicles is completely exposed and does not have any protection such as frame components to protect the engine and/or transmission oil pans. With the added complication of older vehicles having a worn suspension, it is critical to have adequate clearance between the undercarriage of the vehicle and the wheel lift of the tow vehicle before transporting the vehicle.

Adequate clearance may be difficult to achieve with the wheel lift system. The operator of the tow vehicle may proceed to transport the vehicle, thinking that adequate clearance has been achieved, but driving over a pothole or bump or other uneven road surface may prove otherwise. One of the greatest damage claim payouts throughout the industry is oil pan damage, ranging from $200.00 to $1,500.00 for a single repair. In a given year, such claims occur frequently enough to become a costly annoyance to the average fleet of tow vehicles. For the owner-operator of a towing service, even one or two in a year may take a financial toll in terms of increased insurance costs, customer dissatisfaction, and time spent both in preventing future claims and settling past claims.

For most operators of tow vehicles, the main method used to gain adequate clearance is to attach to the vehicle using the wheel lift, raise the vehicle, place a block of wood under each of the raised wheels, lower the vehicle onto the blocks and reattach the vehicle with a tighter fit around the tires. This allows the vehicle to ride higher in the wheel lift, and helps gain some additional clearance. This process also has to be performed when unloading the vehicle. This method is time consuming and cumbersome and not always reliable. Generally, there is much more work involved to transport these vehicles.

SUMMARY OF THE INVENTION

The present invention relates to a pillow for towing a vehicle comprising a bladder having a top, a bottom, and sides, a valve attached to the bladder for inflating and deflating the bladder, and the bottom of the pillow having a wheel lift conforming attachment for conforming to a wheel lift of a tow vehicle.

In a further aspect of the invention, a method of towing a vehicle comprises the steps of placing a vehicle having an undercarriage and weight on a wheel lift of a tow vehicle, inserting a resilient pillow between the wheel lift and the undercarriage of the vehicle and securing the resilient pillow to the wheel lift, transporting the vehicle to a destination, removing the resilient pillow from between the vehicle and the wheel lift once the vehicle has arrived at the destination, and removing the vehicle from the wheel lift.

These and other aspects of the invention are set out in the claims, which are incorporated here by reference.

BRIEF DESCRIPTION OF THE FIGURES

Preferred embodiments of the invention will now be described with reference to the figures, in which like reference characters denote like elements, by way of example, and in which.

DETAILED DESCRIPTION OF THE PREFERRED EMBODIMENTS

Figure 1:
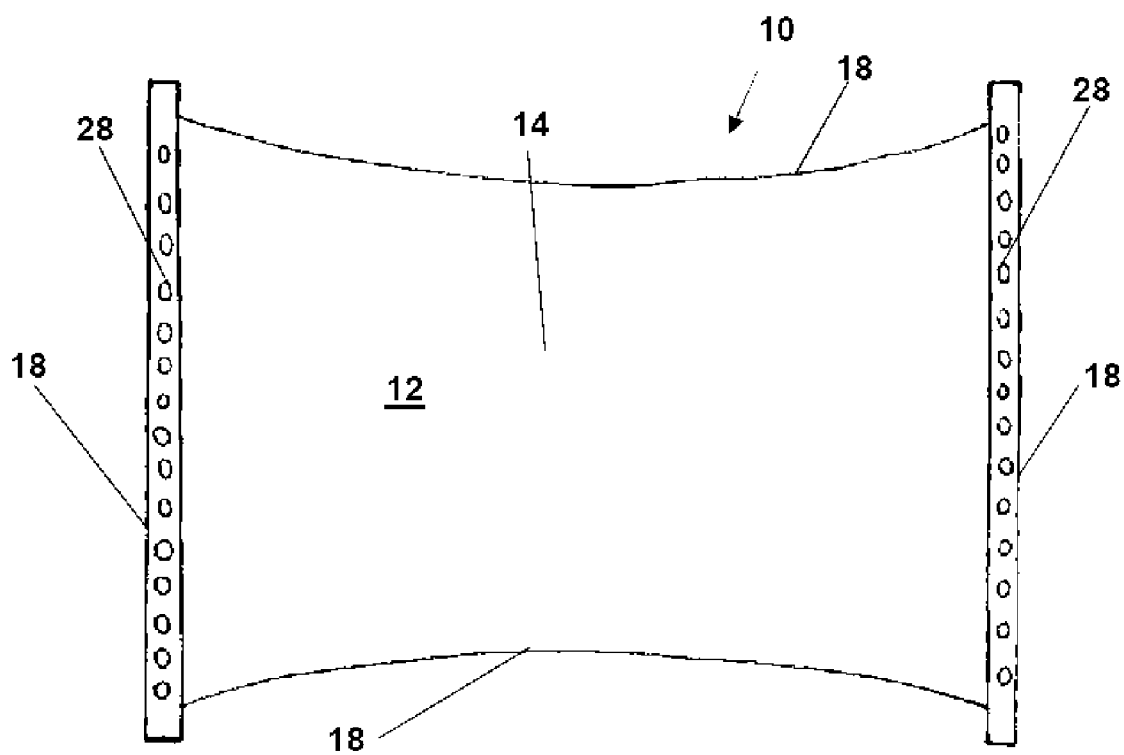
FIG. 1 is a top view of one embodiment of a pillow according to the present invention.

In the claims, the word "comprising" is used in its inclusive sense and does not exclude other elements being present. The indefinite article "a" before a claim feature does not exclude more than one of the feature being present. The phrase "tow vehicle" includes any towing vehicle that uses a wheel lift, and is not limited to a tow truck. The phrase "wheel-lift conforming attachment" includes any form of attachment that conforms to the wheel lift of a tow vehicle, such as legs, straps with fasteners, a strong magnet, or the bottom of a bladder having a particular shape, and is not limited to legs. The word "vehicle" includes any vehicle being transported by a tow vehicle. The word "undercarriage" when referring to a vehicle includes any portion of a vehicle that is exposed to the ground, such as the oil pans or the drive train. The word "resilient" refers to the property of being compressible when pressure is applied and of returning to a pre-existing shape once pressure is removed.

As seen in FIGS. 1 to 4, the pillow 10 has a bladder 12 having a top 14, a bottom 16, and sides 18. A valve 20 is attached to the bladder 12 for inflating and deflating the bladder 12. The bottom 16 of the bladder 12 has a wheel-lift conforming attachment 22 for attaching the pillow 10 to a wheel lift of a tow vehicle, such as legs for straddling the wheel lift.

The bladder 12 may be made out of any expandable material that is air impermeable, but in a preferred embodiment, rubber tubing 3/16ths of an inch thick with a diameter of 10 inches is used. The rubber tubing is reinforced with fibre cord running through the rubber. In a preferred embodiment, the bladder 12 is made from a single piece of the rubber tubing as just described, cut twenty-four inches long. When flattened, the rubber tubing forms a rectangle roughly twenty-four inches long and fifteen inches wide. The rubber tubing is manufactured by several different companies and is readily available. Alternatively, the bladder 12 may be made of a seamless, continuous piece of expandable material, such as from a molded rubber.

The valve 20 may be a conventional, automobile type valve stem with a forty five degree bend on the shaft. The valve 20 may have a washer and nut to secure the valve stem 20 to the outer portion of the bladder 12. It should be understood that any valve suitable for inflating and deflating the bladder 12 may be used.

Figure 5:
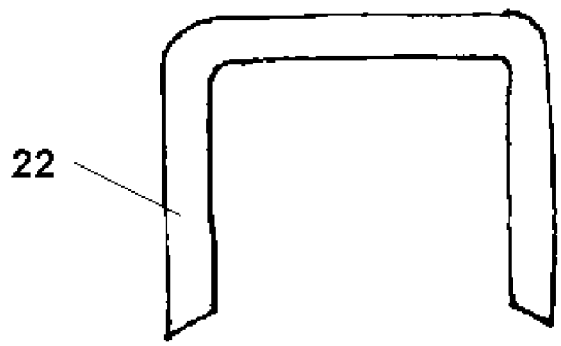
FIG. 5 is a side view of one embodiment of the wheel conforming attachment.
Figure 11:
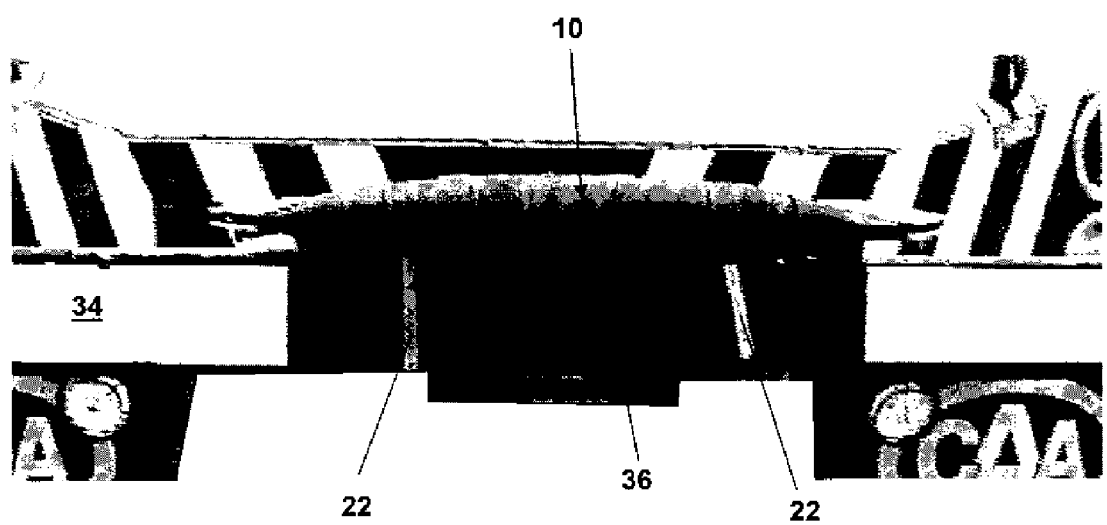
FIG. 11 is a rear perspective view of the pillow of FIG. 1 on a wheel lift of a tow vehicle.
Figure 12:
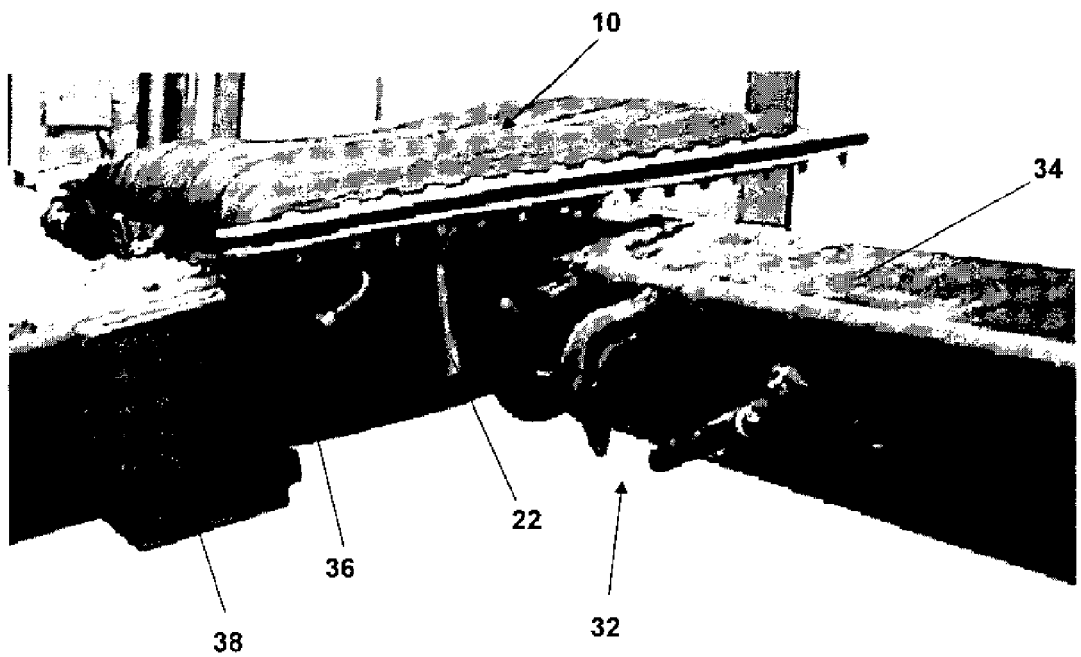
FIG. 12 is a side perspective view of the pillow of FIG. 1 on the wheel lift of a tow vehicle.

The wheel-lift conforming attachment 22 may be legs, such as the legs shown in FIG. 5. Each pair of legs may be made of a piece of solid aluminum tubing roughly 11 inches long and ½ inch in diameter. The legs are formed by bending the tubing at roughly 3½ inches from each end, leaving a width between the legs of just under 4 inches. Other materials and methods for shaping the legs may be used. As shown in FIGS. 11 and 12, it should be understood that the distance between a pair of legs must be sufficient for straddling the cross-bar 34 of a wheel lift 32, and otherwise, the legs may be any length suitable for holding the pillow 10 in position on the wheel lift 32. The legs may be movable between an extended position where the legs point downward to straddle the cross-bar 34 of the wheel lift 32 and a retracted position where the legs are folded up and lie flat against the pillow 10.

Other methods of positioning the pillow 10 on the wheel lift 32 may be employed, such as straps with fasteners, bungee cords, a strong magnet, or other extensions from the bottom of the pillow 10. The pillow 10 may even be shaped such that the bottom 16 of the bladder 12 conforms to the shape of the wheel lift 32. However, for ease and low cost of manufacture and simplicity of design, the embodiment shown is preferred and more than adequate for the purpose. Also, because the operator of a tow vehicle may encounter working conditions where fumbling with straps with fasteners, for example, may be awkward, time-consuming, and frustrating, such as in rainy or snowy weather or in temperatures well below freezing, the simple straddling of the wheel lift 32 with legs is preferred. It is not necessary to secure the pillow 10 to the wheel lift to a greater extent than that accomplished by using the legs, which hold the pillow 10 in place until the pillow 10 is weighted by the vehicle.

In a preferred embodiment, the pillow 10 is assembled by taking a length twenty-four inches long of rubber tubing having a diameter of ten inches and a thickness of 3/16 of an inch. The rubber tubing forms the bladder 12. A valve 20 is inserted through a hole of sufficient size in the rubber tubing, and the valve may be secured by using a washer and nut or other suitable method for securing and sealing the valve to the rubber tubing. Additionally, a piece of rubber three inches wide by six inches long and having a thickness of 1/16 of an inch may be glued for reinforcement purposes to the inside of the rubber tubing over the hole made for the valve 20, with a hole made in the rubber to permit air to enter and escape through the valve. It should be understood that the dimensions of the pillow 10 can be varied according to the requirements for towing a vehicle and for fitting onto a wheel lift of a tow vehicle.

Figure 2:
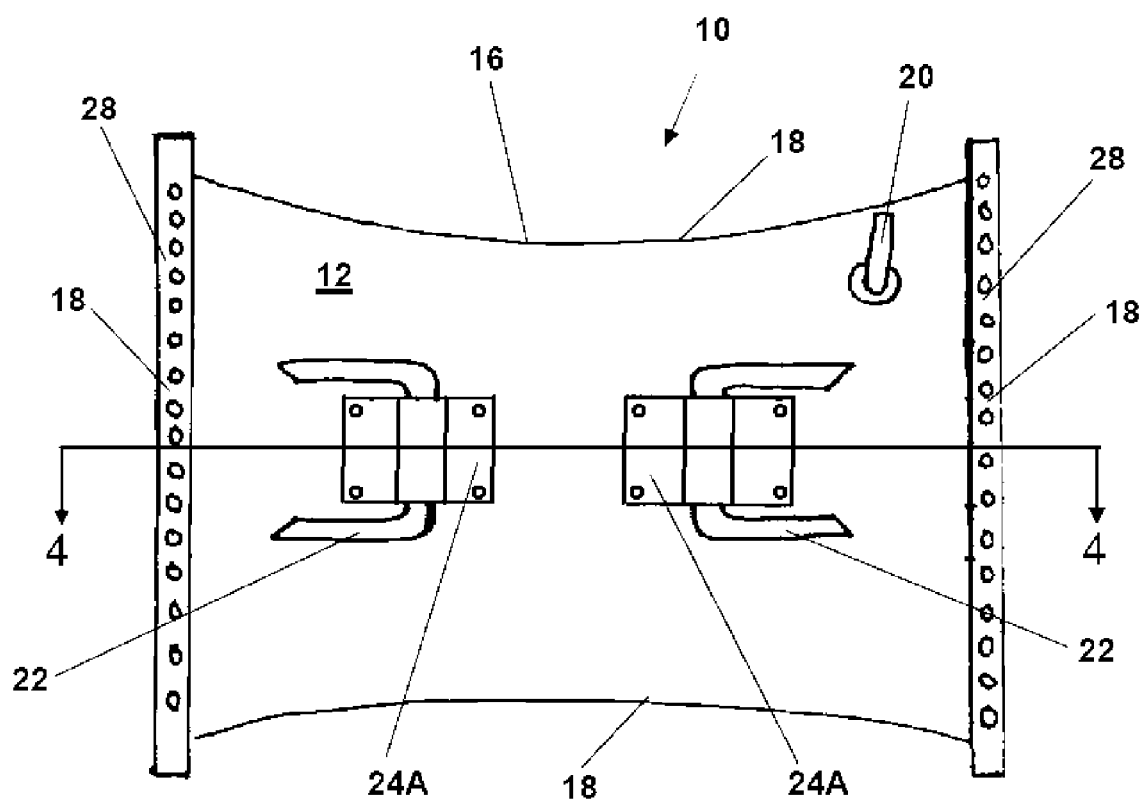
FIG. 2 is a bottom view of a preferred embodiment for attaching the wheel lift conforming attachment to the pillow of FIG. 1.
Figure 4:
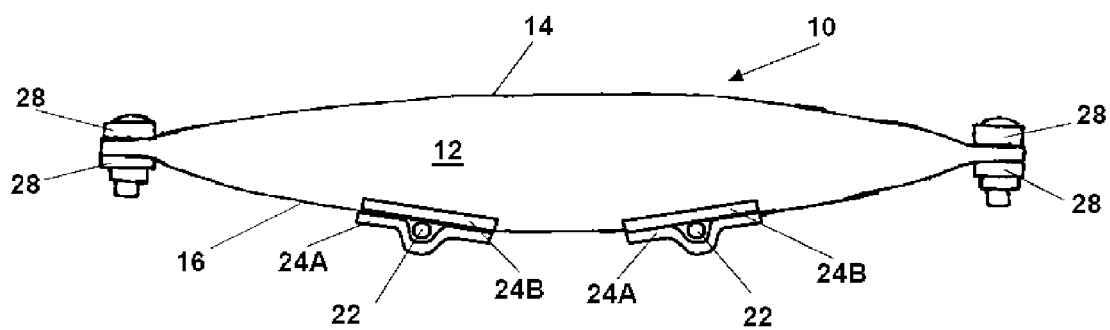
FIG. 4 is a cross-section side view of the pillow of FIG. 2 taken through the line 4.

Next, plastic plates 24A and 24B may be used, as shown in FIGS. 2 and 4. Plastic plate 24B may be flat and placed inside the bladder 12 while plastic plate 24A may have a U-shape in the middle to receive a pair of legs, plastic plate 24A being placed outside the bladder 12 with the wheel conforming attachment 22, such as legs, being placed between the bladder 12 and plastic plate A within the recess formed by the U-shape in plastic plate 24A. Plastic plate 24A may have more than one U-shape to receive multiple pairs of legs, but in a preferred embodiment, each set of plastic plates 24A and 24B hold a single pair of legs. A single pair of legs per set of plastic plates 24A and 24B makes the pillow 10 more easy to fold or roll into a compact shape for stowing on the tow vehicle. Plastic plates 24A and 24B may be riveted together to hold the legs securely in place. The rivets should be positioned far enough from the sides of the plastic plates 24A and 24B so that the rubber tubing of the bladder 12 can form a seal around the rivets once the plastic plates 24A and 24B have been compressed together by the rivets. Once the plastic plates 24A and 24B are in place, the ends of the rubber tubing can be glued together to form the bladder 12.

Figure 3:
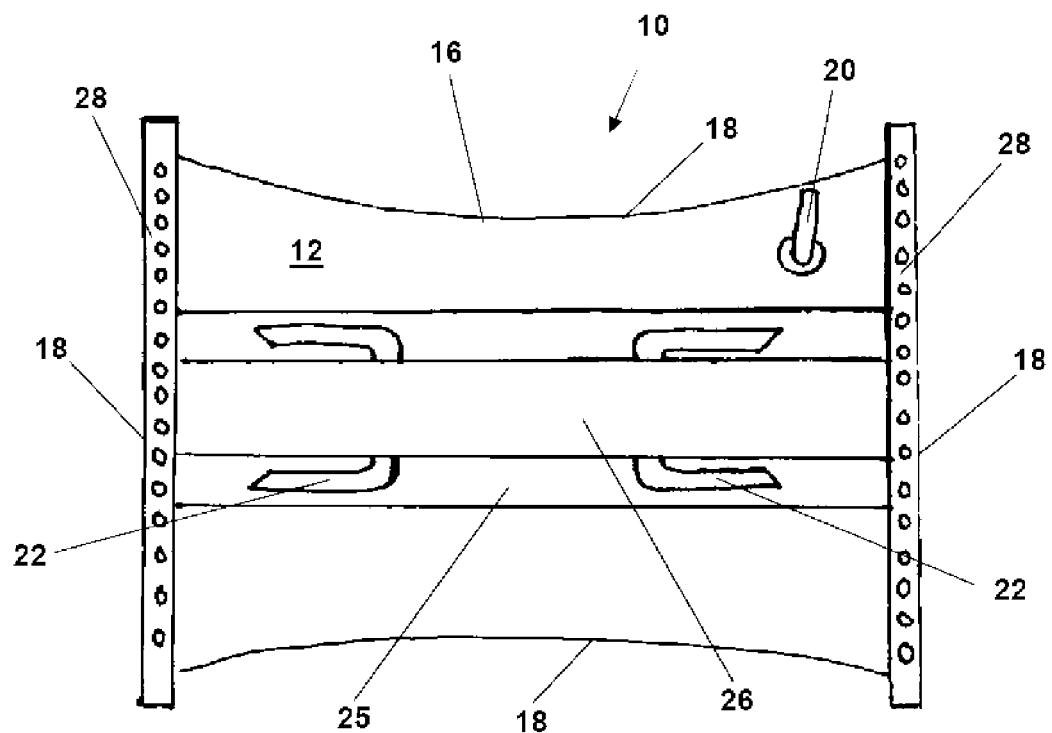
FIG. 3 is a bottom view of an alternative embodiment for attaching the wheel lift conforming attachment to the pillow of FIG. 1.

Alternatively, as shown in FIG. 3, the wheel lift conforming attachment 22, such as legs, are placed between a first rubber strip 25 twenty-four inches long by six inches wide and having a thickness of 1/16 of an inch and a second rubber strip 26 twenty-two inches long by three and a quarter inches wide and having a thickness of 1/8 of an inch, the second rubber strip 26 being positioned roughly in the middle of the first rubber strip 25 and with roughly an inch left at either end, the legs being positioned between the rubber strips 25 and 26 to permit moving the legs between extended and retracted positions. The leg assembly of the legs placed between the rubber strips 25 and 26 is then glued to the bladder 12 by gluing the assembly with the first rubber strip 25 adjacent the bladder 12. The legs may be inserted into hollow tubing of slightly greater diameter than the legs prior to shaping the legs and placing the legs between the rubber strips 25 and 26, to permit free movement of the legs. As shown in FIGS. 11 and 12, the wheel lift conforming attachment 22, regardless of the type used, is preferably no closer than four and a half inches on either side of the centre of the bladder 12 to accommodate the reinforcing plate 36 of a typical wheel lift 32 where the cross bar 34 of the wheel lift 32 forms a T with the bar 38 extending from the tow vehicle. The reinforcing plate 36 is typically eight inches wide. It should be understood that the placement of the wheel lift conforming attachments 22 on the pillow 10 is dependent on what is most suitable for attaching the pillow 10 to the wheel lift 32.

In a preferred embodiment, the sides 18 of the bladder 12 are reinforced, as shown in FIGS. 1 to 4. While all the sides 18 of the bladder 12 may be reinforced, reinforcing two of the sides 18 is adequate. Any method of reinforcing suitable for the purpose may be used, but in a preferred embodiment, four aluminum bars 28 measuring 1 inch wide×18 inches long×1/8th of an inch thick may be used. The aluminum bars 28 are placed on opposing sides 18 of the bladder 12, two on the top 14 of the bladder 12, two on the bottom 16 of the bladder 12 to act as clamps. The bars 28 are then riveted together.

Figure 6:
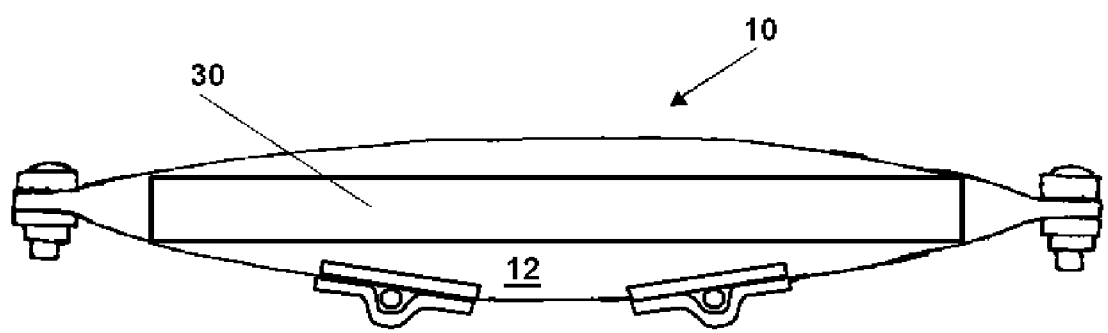
FIG. 6 is a cross-section side view of the pillow of FIG. 2 with a foam core.
Figure 7:
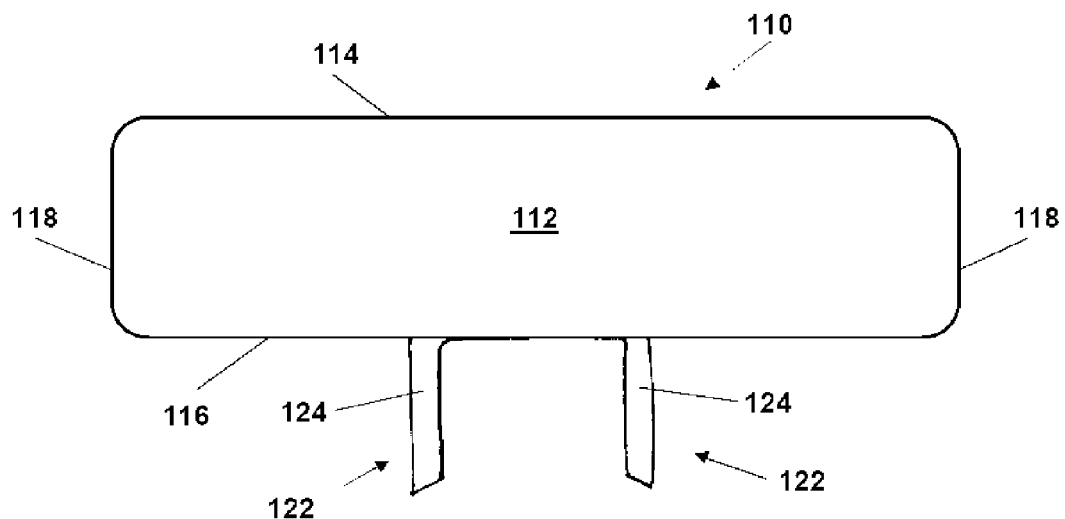
FIG. 7 is a cross-section side view of an alternative embodiment of the invention in an uncompressed form.
Figure 8:
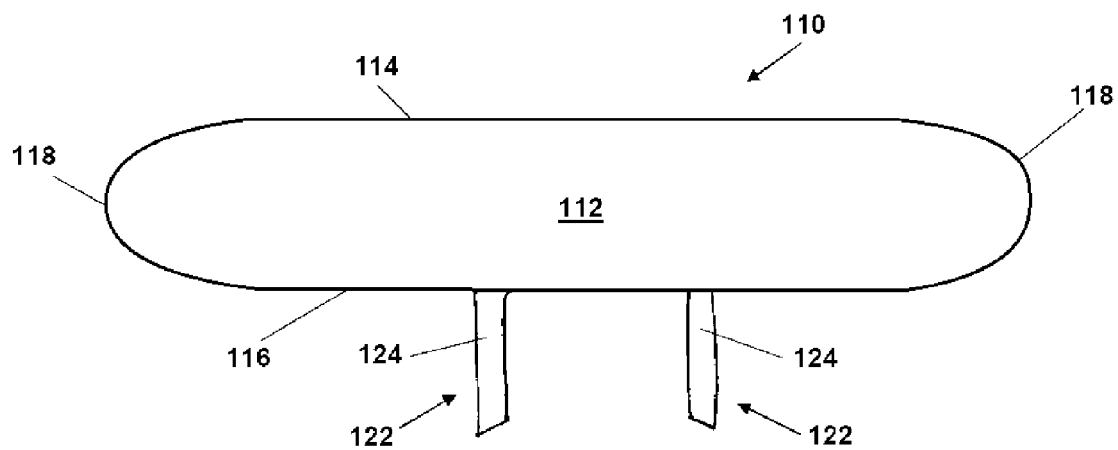
FIG. 8 is a cross-section side view of an alternative embodiment of the invention in a compressed form.
Figure 9:
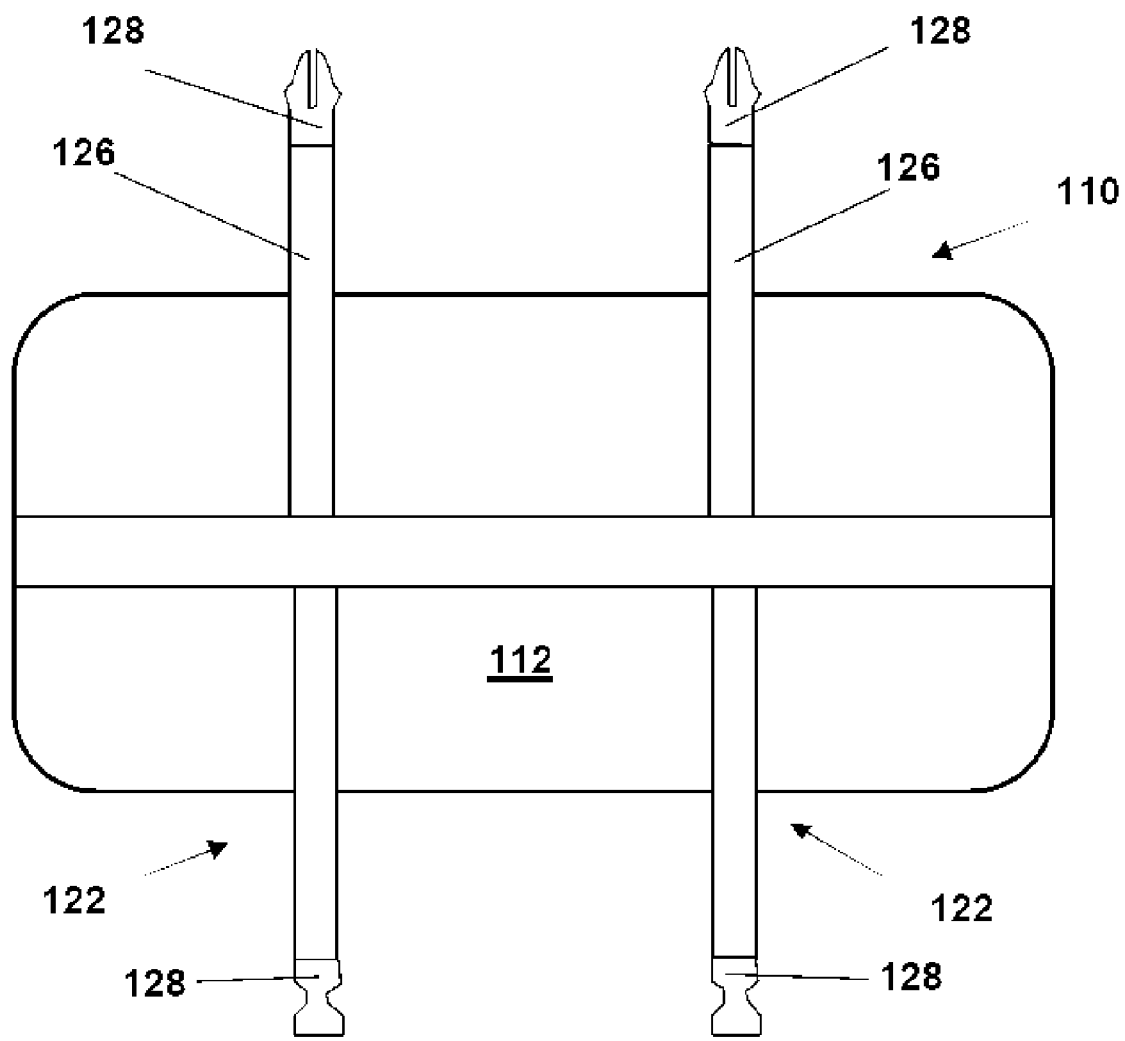
FIG. 9 is a bottom view of an alternative embodiment of the invention in which the extensions are straps with fasteners.
Figure 10:
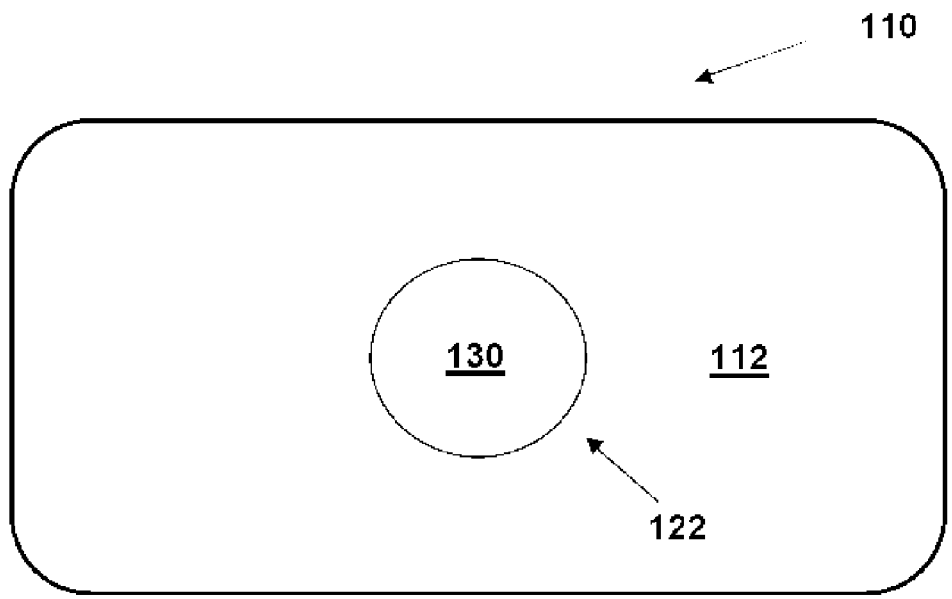
FIG. 10 is a bottom view of an alternative embodiment of the invention in which the extension is a strong magnet.

As shown in FIG. 6, the pillow 10 may also include an internal closed cell foam core 30 to provide further protection in the event that the bladder 12 deflates while the vehicle is being transported. The foam core 30 need only be of sufficient thickness to prevent metal on metal contact between the undercarriage of the vehicle and the wheel lift. Preferably, the foam core 30 does not interfere with the inflation and deflation of the bladder 12.

In an alternative embodiment as shown in FIGS. 7 through 10, the pillow 110 comprises a resilient body 112 having a top 114, a bottom 116, and sides 118. The bottom 116 of the resilient body 112 has extensions 122 for securing the resilient body 112 to the wheel lift of a tow vehicle. The extensions 122 may be, for example, legs 124, straps 126 with fasteners 128, or a strong magnet 130. The resilient body 112 may be inflatable, but need not be inflatable, and may include, for example, an inflatable bladder, a closed cell foam body, or a combination of the two.

The pillow 10 or 110 provides protection to the undercarriage of a vehicle and allows the operator of a tow vehicle to gain adequate clearance in both the front and the back of the vehicle when transporting the vehicle. The pillow 10 or 110 is lightweight, compact, and may be easily stowed away in the tow vehicle when not in use.

The wheel lift of a typical tow vehicle may perform three different functions, loosely described as In/Out, Straight Up/Down, and Tilt Up/Down. When raising a vehicle, the operator seeks to achieve maximum tilt for maximum clearance. There are many times when maximum tilt may not be achieved because there is not adequate clearance at the rear of the vehicle. For example, the vehicle may have low clearance to begin with, either by design or through modification, or the exhaust pipe of the vehicle may drag or scrape if the vehicle is overly tilted on the lift. By using the pillow 10 or 110, the angle for towing the vehicle may be adjusted to a more horizontal position, thus giving more than adequate clearance to the front and the rear of the vehicle during transport.

Many automobile manufacturers may recommend that a particular model should not be towed using a wheel lift, but should be towed instead either on a flatbed truck or by using a dolly, generally because of clearance issues. To "dolly" a vehicle is a term used when all four wheels of the vehicle have to be raised off the ground before the vehicle may be transported. When a dolly is used, it generally adds 20 to 30 minutes to the duration of a call just to hook up the vehicle. For rural contractors traveling any distance, there is also additional time lost due to the speed restriction of the dollies. Dollies may also be clumsy, heavy, and dangerous if the dolly should fail while transporting a vehicle. Wherever possible, the typical operator of a tow vehicle seeks to minimize the use of dollies wherever possible. By using the pillow 10 or 110, many instances where dollying is otherwise recommended may be dealt with simply by using the pillow 10 or 110.

Figure 13A:
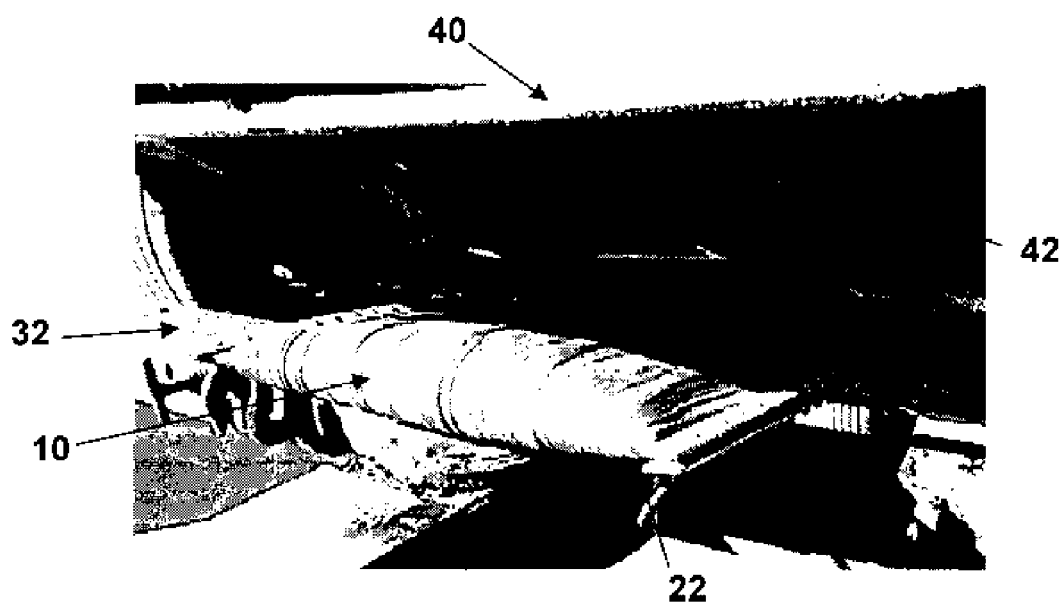
FIGS. 13A, 13B, and 13C show perspective views of the pillow of FIG. 1 as used in the method according to the present invention.
Figure 13B:
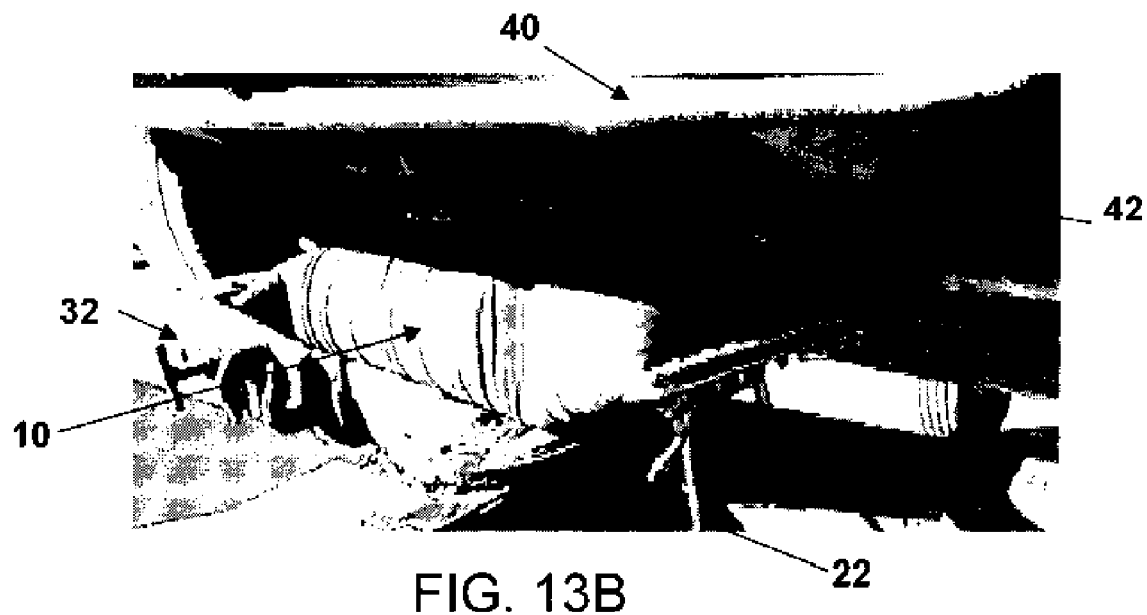
Figure 13C:
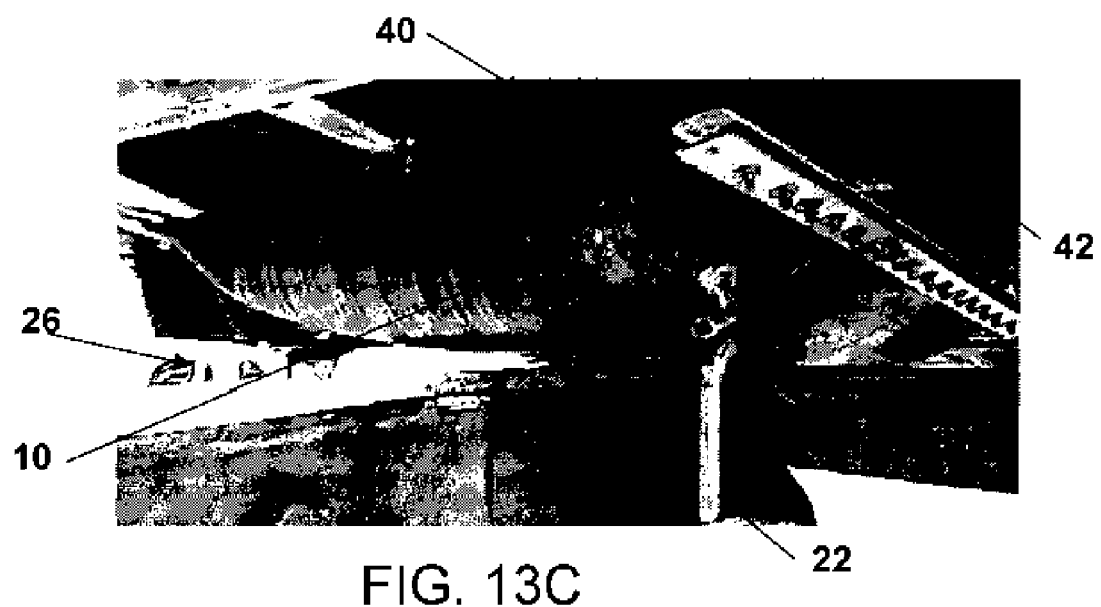

As shown partly in FIGS. 13A-13C, a method of towing a vehicle involves providing a pillow 10 according to the present invention. Next, a vehicle 40 is placed on the wheel lift 32 in conventional fashion. The pillow 10 is then inserted roughly at the centre of the cross bar 34 of the wheel lift 32 between the wheel lift 32 and the vehicle 40 with the wheel lift conforming attachments 22 of the pillow 10 straddling the wheel lift 32. The pillow 10 is then inflated until the pillow 10 touches the undercarriage 42 of the vehicle 40. Typically, the pillow 10 will touch the oil pan. Once the pillow 10 is inflated, the wheel lift 32 may be tilted downward to a more horizontal position with at least a portion of the weight of the vehicle 40 resting on the pillow 10. By loading some of the weight of the vehicle 40 on the pillow 10, it also helps to secure the pillow 10 in place. The wheel lift conforming attachments 22 provide initial positioning for the pillow 10 and once the pillow 10 is loaded by the weight of the vehicle 40, the wheel lift conforming attachments 22 also assist in preventing the pillow 10 from sliding out from under the vehicle 40 in the event that a bump, pothole, or uneven surface is encountered in the road. The vehicle 40 may now be transported in a safe manner to the destination without risk or worry of damaging the oil pans. Upon arrival at the destination, the pillow 10 is deflated and removed, and the operator may continue with the detachment of the vehicle 40 from the tow vehicle in conventional fashion.

The pillow 10 requires very little pressure to inflate, and may actually be inflated to enough pressure with the human lungs, similar to blowing up a balloon. Typically, however, the pillow 10 will be inflated by an air source, such as an air compressor generally found on a conventional tow vehicle. When inflating the pillow 10, care must be taken not to over-inflate the pillow 10. If the pillow 10 is over-inflated, the pillow 10 will lose at least some of the cushioning benefits of the pillow 10, and the pillow 10 is more likely to fail once weighted by a vehicle, for example, by developing a leak or bursting altogether. Deflating the pillow 10 is done in a conventional manner. A second valve (not shown) may be installed on the bladder 12 for rapid deflation of the pillow 10, such as a valve stem without a valve core, for example.

Immaterial modifications may be made to the embodiments of the invention described here without departing from the invention.

What is claimed is:

1. A pillow for towing a vehicle in combination with a wheel lift, comprising:
    a wheel lift of a tow vehicle, the wheel lift having a boom extending from the tow vehicle and a cross-bar extending laterally from the boom and forming a T junction with the boom;
    a bladder having a top, a bottom, and sides;
    a valve attached to the bladder for inflating and deflating the bladder; and
    the bottom of the bladder having a wheel lift conforming attachment configured to fit on and secure the bladder to the wheel lift, the bladder being detachably secured on top of the cross-bar of the wheel lift at the T junction by the wheel lift conforming attachment.

2. The pillow for towing a vehicle in combination with a wheel lift of claim 1 in which the wheel lift conforming attachment comprises legs.

3. The pillow for towing a vehicle in combination with a wheel lift of claim 2 in which the legs are movable between an extended position and a retracted position.

4. The pillow for towing a vehicle in combination with a wheel lift of claim 1 in which the wheel lift conforming attachment comprises straps with fasteners.

5. The pillow for towing a vehicle in combination with a wheel lift of claim 1 in which sides of the bladder are reinforced.

6. The pillow for towing a vehicle in combination with a wheel lift of claim 1 in which the bladder is seamless.

7. The pillow for towing a vehicle in combination with a wheel lift of claim 1 in which the bladder is made out of a fiber-reinforced rubber membrane.

8. The pillow for towing a vehicle in combination with a wheel lift of claim 1 further comprising an internal closed cell foam core disposed within the bladder.

9. The pillow of claim 1 in which the tow vehicle is a tow truck.

10. A method of towing a vehicle comprising the steps of:
    placing a vehicle having an undercarriage and weight on a wheel lift of a tow vehicle, the wheel lift attaching to and directly supporting the wheels of the vehicle without using a sling;
    the wheel lift having a boom extending from the tow vehicle and a cross-bar extending laterally from the boom to form a T junction;

inserting a resilient pillow between the wheel lift and the undercarriage of the vehicle and securing the resilient pillow to the wheel lift on top of the cross-bar at the T junction;

transporting the vehicle to a destination;

removing the resilient pillow from between the vehicle and the wheel lift once the vehicle has arrived at the destination; and removing the vehicle from the wheel lift.

11. The method of claim 10 further comprising the step of tilting the wheel lift in a downward direction until at least a portion of the weight of the vehicle rests on the resilient pillow after the resilient pillow is inserted between the wheel lift and the undercarriage of the vehicle and secured to the wheel lift and prior to transporting the vehicle to a destination.

12. The method of claim 10 in which the tow vehicle is a tow truck.

* * * * *